United States Patent [19]
Aoki et al.

[11] Patent Number: 4,940,134
[45] Date of Patent: Jul. 10, 1990

[54] WASTE SOLUTION TREATMENT METHOD AND APPARATUS THEREFOR

[75] Inventors: Syozo Aoki; Satoru Kuse, both of Hino; Shigeharu Koboshi, Sagamihara, all of Japan

[73] Assignee: Konishiroku Photo Industry Co., Ltd., Tokyo, Japan

[21] Appl. No.: 271,383

[22] Filed: Nov. 14, 1988

Related U.S. Application Data

[63] Continuation of Ser. No. 32,633, Apr. 1, 1987, abandoned.

[30] Foreign Application Priority Data

Apr. 4, 1986 [JP] Japan .................................. 61-78885

[51] Int. Cl.⁵ .......................... B01D 3/08; B01D 3/42
[52] U.S. Cl. ..................... 202/202; 159/11.1; 159/22; 159/42; 159/43.1; 159/47.3; 202/181; 202/182; 202/187; 202/238; 202/269; 203/1; 203/2; 203/4; 203/40; 210/694; 210/774; 354/329; 354/352; 354/354
[58] Field of Search .................... 159/47.3, 22, 11.1, 159/42, 43.1, DIG. 42; 202/202, 197, 181, 182, 238, 269; 203/1, 2, 4, 40, 91; 354/329, 352, 354; 55/36; 210/694, 774

[56] References Cited

U.S. PATENT DOCUMENTS

| | | | |
|---|---|---|---|
| 3,210,260 | 10/1965 | Denker et al. | 203/22 |
| 3,215,190 | 11/1965 | Svanoe | 159/11.1 |
| 3,764,483 | 10/1973 | Tleimat | 202/236 |
| 3,851,662 | 12/1974 | Jessop | 354/324 |
| 3,995,298 | 11/1976 | Vandeputte et al. | 159/DIG. 1 |
| 4,045,293 | 7/1977 | Cooksley | 202/202 |
| 4,208,298 | 6/1980 | Irie et al. | 203/4 |
| 4,222,825 | 9/1980 | Eiden | 202/203 |
| 4,269,663 | 5/1981 | McFee | 202/202 |
| 4,640,769 | 8/1985 | Wemhoff | 202/202 |
| 4,724,044 | 2/1988 | Weishaar et al. | 202/181 |

FOREIGN PATENT DOCUMENTS

| | | | |
|---|---|---|---|
| 0677166 | 12/1963 | Canada | 202/185.3 |
| 1090282 | 11/1980 | Canada | 202/185.3 |
| 0070841 | 5/1985 | Japan | |

*Primary Examiner*—Virginia Manahoran
*Attorney, Agent, or Firm*—Finnegan, Henderson, Farabow, Garrett and Dunner

[57] ABSTRACT

An apparatus for treating a waste solution generated when a photosensitive material is processed by an automatic developing machine includes a waste solution reservoir which is maintained at a constant level. A drum, partially immersed in the waste solution, is rotated to coat its surface. The drum is heated to produce a waste vapor. The waste vapor is condensed by a condenser and filtered and solid wastes are scraped from the surface of the drum. The condenser has a drain tank for collecting condensate and a non-condensable gas component. The interior of the drain tank is sealed to form an air tight seal and has a vent for exhausting the non-condensable gas component from the interior portion to the outside. The air vent includes an absorption tower to treat the non-condensable gas component.

3 Claims, 8 Drawing Sheets

(a)

(c)

(b)

WASTE SOLUTION TREATMENT METHOD AND APPARATUS THEREFOR

This application is a continuation, of application Ser. No. 032,633, filed Apr. 1, 1987, now abandoned.

BACKGROUND OF THE INVENTION

The present invention relates to a waste solution treatment method and the apparatus therefor, and more particularly, to those suitable for treating waste solution discharged as a result of a development of a photographic light-sensitive material (photosensitive material) with an automatic developing machine, within an automatic developing machine or in the vicinity thereof.

Normally, in a photographic treatment of a silver halide photographic light-sensitive material, a monochrome light-sensitive material (black and white photosensitive material) is fixed, and water-washed and a color light-sensitive material (color photosensitive material) is color-developed, bleach-fixed (or bleached and fixed), water-washed, and stabilized.

In the photographic processing of a large quantity of light-sensitive materials, any component which has been consumed for a photographic processing is replenished. A component which has eluted as a result of the photographic processing or a component which has condensed as a result of evaporation (for example, bromide ions which exist in a developer and silver complex salts which exist in a fixing solution) are removed to maintain the content rate of each component of the processing solution to be constant, whereby the performance of the processing solution does not vary. In this photographic processing, a replenisher is supplied with the processing solution and part of the processing solution is wasted to remove the concentrated component.

In recent years, the amount of a processing solution as well as water is reduced to a great extent in carrying out a photographic processing in order not to cause environmental pollution and to carry out a photographic development at a low cost.

In automatic developing machines, a waste solution of a photographic processing is fed from a treating tank to a waste solution pipe where the waste solution is diluted with a coolant provided with the automatic developing machine, and then, wasted in sewerages.

According to Water Pollution Control Law and prefectural ordinances recently put into force, it is permitted to waste water and coolants used for photographic processings to sewerages and rivers, however, it is not permitted to waste photographic waste solutions such as a developer, fixing solution, color developer, bleach-fix solution (or bleaching solution and fixing solution), and stabilizing agent to sewerages and rivers. Following methods for reducing pollution load caused by photographic processing waste solutions are known: Activated sludge method (disclosed in Japanese Patent Laying-Open Publication Nos. 7952/1976 and 12943/1976); evaporation method (disclosed in Japanese Patent Laying-Open Publication No. 89437/1974 and Japanese Patent Examined Publication No. 33996/1981); electrolytic oxidation method (disclosed in Japanese Patent Laying-Open Publication Nos. 84462/1973, 119457/1974, 119458/1974, and Japanese Patent Examined Publication No. 43478/1978); ion exchange method (disclosed in Japanese Patent Examined Publication Nos 37704/1976 and 43271/1978, and Japanese Patent Laying-Open Publication No. 383/1978); reverse osmosis method (disclosed in Japanese Patent Laying Open Publication No. 22463/1975); chemical treating method (disclosed in Japanese Patent Laying-Open Nos. 64257/1974, 12152/1978, 58833/1974, 63763/1978, Japanese Patent Examined Publication Nos. 37395/1982, and 37396/1982). These methods, however, are not effective for reducing pollution load of photographic processing waste solutions.

An apparatus which facilitates a treatment of a photographic waste solution was proposed in Japanese Utility Model Laying-Open Publication No. 70841/1985. According to the disclosure, pressure is applied to a photographic waste solution so as to evaporate, and then, condense or solidify the photographic waste solution. When the photographic waste solution is evaporated, poisonous gases or gases having an offensive odor such as sulfur dioxide, hydrogen sulfide, ammonia gas are generated. This is because ammonium thiosulfate and sulfites (ammonium salts, sodium salts and potassium salts) contained in a photographic solutions such as a fixing solution and a bleach-fix solution are decomposed at a high temperature. In addition to the gas generation, the pressure in an evaporation oven increases owing to the cubical expansion caused by the aerification of water which is contained in photographic waste solution when an evaporation treatment is carried out. As a result, the above-described poisonous gases or gases having an offensive odor leak from a waste solution treatment apparatus.

SUMMARY OF THE INVENTION

The present invention has been developed to solve the above-described problem.

It is an object of the present invention to provide a waste solution treatment method and the apparatus therefor which is capable of preventing the leakage of gases consisting of poisonous gases or gases having an offensive odor generated when a photographic waste solution is treated by way of evaporation.

It is another object of the present invention to provide a waste solution treatment method and the apparatus therefor which is preferable in thermal and evaporation efficiencies and is capable of reducing energy cost, and manufacturing a compact apparatus for treating a waste solution.

It is still another object of the present invention to provide a waste solution treatment method and the apparatus therefor which is suitable for treating a waste solution, discharged when a photographic light-sensitive material is processed by an automatic developing machine, within the automatic developing machine or in the vicinity thereof.

It is further object of the present invention to provide a waste solution treatment method and the apparatus therefor wherein a bubbling or foaming phenomenon takes place on an evaporating process in a slight degree.

An apparatus according to the present invention which is capable of attaining the objects of the present invention comprises storage means for storing a waste solution; an evaporation means having a heating means for heating the waste solution; a supplying means for supplying the waste solution with the evaporation means; and a heat exchanging means for condensing steam generated by the evaporation means.

The waste solution treatment method of attaining the objects according to the present invention comprises a supplying step of supplying a waste solution with an evaporation step; a storage step of storing the waste solution supplied by the supplying step; an evaporation step having a heating step; and a heat exchange step of condensing steam generated by the evaporation step.

DETAILED DESCRIPTION OF THE INVENTION

Figure 1:
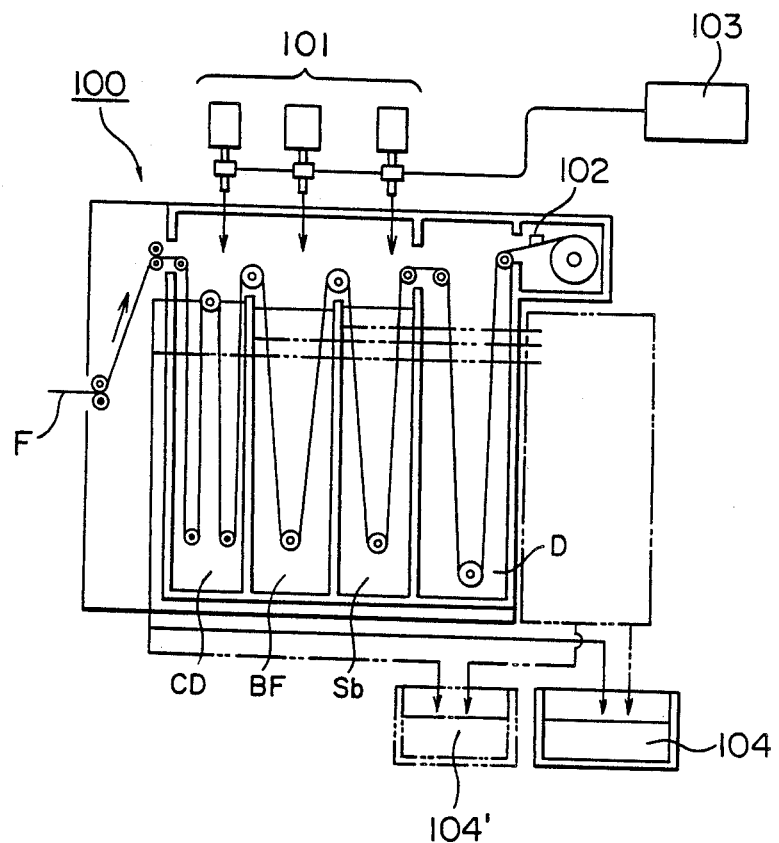
FIG. 1 shows a sectional view of an automatic developing machine.

The present invention will be described in detail hereinafter. The advantage of the present invention cannot be obtained unless the following three means and steps A, B, and C are used in combination thereof. An evaporation means and step A of evaporating a waste solution by the evaporation means having a storage means and step of collecting the waste solution by the storage means and a heating means for heating the waste solution; a supplying means and step B of supplying the waste solution with the evaporation means and step of evaporating the waste solution by the evaporation means; a heat exchange means and step C of condensing steam generated by the evaporation means and step of evaporating the waste solution by the evaporation means. If the invention is embodied without using any one of these three means and steps, the advantage of the present invention cannot be obtained. For example, if the supplying means and step B of supplying the waste solution with the evaporation means is not used, a compact and easy waste solution treatment method and the apparatus therefor do not function favorably. If the evaporation means and step A of evaporating the waste solution by the evaporation means is not used, an evaporation treatment cannot be performed. If the heat exchange means and step of condensing steam generated by the evaporation means is not used, the waste solution is vaporized, resulting in an expanded volume. In this case, it is advantageous to condense the steam using this means and step of condensing steam generated by the evaporation means.

The feeding means according to the present invention for feeding air and/or non-condensed component, which has passed the heat exchange means, to the evaporation means improves evaporation efficiency, and perfectly treats poisonous or an offensive odor gases generated when a waste solution is evaporated, thereby preventing the gases from leaking to the exterior of a developing machine.

The gas treatment column, which communicates with outside air, according to the present invention, treats the noncondensed component to allow it to be discharged outside, whereby poisonous or an offensive odor gases generated when a waste solution is evaporated can be efficiently removed from the developing machine.

According to the present invention, a sensor which detects liquid amount is provided with the storage means. Therefore, the storage means for storing a waste solution is automatically provided with the waste solution according to output information transferred from the sensor, which allows the construction of the apparatus of the invention to be compact and the apparatus to be used easily. The sensors which detect the amount of liquid include those which detect the weight of a waste solution; liquid level; electric conductivity; optical density; evaporation density; evaporation temperature; and viscosity. Among others, a sensor for detecting the weight of or liquid level of a waste solution and a sensor which detects liquid level are most favorable for carrying out a reliable (exact) supply of a waste solution. As a modification according to the present invention, batch treating system is preferably used for the storage means, wherein a waste solution is supplied to the storage means in the amount less than treated for one operation.

The heating means according to the present invention is preferably provided either at the exterior of the storage means for storing a waste solution or immersed in the waste solution stored in the storage means. Heating means provided outside an automatic developing machine include a far infrared ray heater, heated air typeheater, silica tube heater, pipe heater, plate type-heater. The far infrared ray heater and heated air-type heater (method for heating by means of air heated by a nichrome wire) are preferable from the standpoint of evaporation efficiency.

The scoop-up means, provided with the evaporation means, for scooping up a waste solution stored in the storing means increases evaporation efficiency. The scoop-up means is very effective for increasing evaporation efficiency when a waste solution scooped up by the scoop-up means is heated by the heating means. One or more rotating drums or an endless belt are preferably used as the scoop-up means. The endless belt is more favorable than the rotating drum because the evaporation means is compactly formed.

It is preferable that the scoop-up means is provided with a scraping means for scraping condensed or dried substance contained in a waste solution. The scraping means composed of a metal plate or a synthetic resin serves to scrape condensed or dried substance contained in the waste solution, that is, the scoop-up means is provided with the scraping means so that substance separated by the scoop-up means from the waste solution and condensed or dried may be prevented from being returned to the waste solution. By virtue of the provision of the scraping means, the waste solution can be continuously evaporated, that is, the waste solution treatment can be very efficiently and easily performed.

If the scoop-up means is not provided with the scraping means for scraping condensed or dried substance, a waste solution stored in the waste solution storage means is condensed in proportion to the increase of evaporated amount of the waste solution. Therefore, it is preferable to provide a means for periodically discharging a condensed waste solution from the waste solution storage means. In order to efficiently evaporate the waste solution and obtain the advantage of the present invention, it is preferable to discharge condensed or dried substance when it is condensed to 1/5 to 1/25, and more favorably 1/7 to 1/15 of the original concentration.

Sensors having the following functions are preferably provided with the apparatus of the present invention, that is, a sensor which detects the electric conductivity, optical density, and viscosity of the waste solution; sensor which detects the liquid level of the waste solution contained in the waste solution tank provided in the interior or exterior of the waste solution apparatus and/or the waste solution storage tank; an integrating meter for integrating how long it takes for the supply means to supply a waste solution from the waste solution tank to the waste solution storage means. When the batch treating method is used, a sensor which detects the weight, liquid level, electric conductivity, optical density, and viscosity of a waste solution is preferably used.

According to the invention, it is preferable to use a waste solution discharging bag which acts as a waste solution storage means. When condensed or dried substance is collected in the discharging bag in a predetermined amount, it is taken out of an apparatus of the invention. As material for the discharging bag, 6 - nylon, 6, 6 - nylon and compounds of polyamide group are preferably used. These substances are resistant to temperatures as high as 100° to 400° C. Bags used in an household cooking oven or an electronic range may be utilized as the waste solution discharging bag.

The apparatus of the present invention is provided with a gas treatment column which communicates with outside air. When a waste solution is heated, water contained therein is vaporized, with the result that the pressure in the evaporation device increases. In this case, poisonous gas leaks to the exterior of the waste solution apparatus through this gas treatment column. Accordingly, gas treatment means can be provided including means for regulating the pressure of the interior of enclosure means 46' to establish a pressure differential between the pressure the interior of the enclosure means and the ambient pressure. Further, the gas treatment column serves as a means for preventing the evaporation device from being over-pressurized. When the waste solution treatment apparatus is stopped, steam or gases which have expanded by heating during the running of the apparatus reduce their volume, with the result that the pressure inside the apparatus is reduced, resulting in negative pressure. In this case, outside air is introduced through the gas treatment column, whereby the apparatus is free from breakage. Absorbents such as activated carbon, zeolite or deodorants are preferably used inside the gas treatment column. The configurations of the absorbents and deodorants are preferably granular because they are required to have fluidity. The favorable particle diameter of the absorbents and deodorants are in the range from 0.3 mm to 15 mm, and more favorably, it ranges from 0.8 mm to 6 mm, whereby the objects of the present invention can be attained.

According to the present invention, granular activated carbon is most favorably used because it is economical and easily handled. Favorable granular activated carbons include those manufactured by TOYO CALGON CO., LTD., such as BPL, PCB, FILTER ASORB 400, CANECAL, CAL, CPG, SGL, FILTRASORB 300, APC, IVP, HGR, CP - 4, FCA; those manufactured by NORIT CO., LTD., such as PK, RO, ROW, R - 20, PB, R. Extra, sobonorit, SX, SA, PN, ZN, W.AZO, CA, CN; those (white eagle series) manufactured by Takeda Chemical Industries Ltd.

Preferable deodorants include Daimushu and porous fiber, Aniko (described in pages 62 and 63 of TRIGGER issued in November, 1985) containing several percent of Iron (III) - phthalocyanine manufactured by DAINIHON SEIKI KOGYO CO., LTD.

The inventors of the present invention discovered as a result of researches that poisonous gas, generated when a waste solution is evaporated, is dissolved in condensed water, which may lead to an environmental pollution load.

Sulfur dioxide, ammonia, and hydrogen sulfide gas are dissolved in a waste solution of a photographic waste solution, so that organic solvents and organic acids such as ethyleneglycol, acetic acid, diethyleneglycol, benzyl alcohol which have been gasificated as a result of evaporating with water distillate in the condensed water.

Therefore, the condensed water containing such substance has a great pollution load such as BOD and COD, which means that a discharge of such condensed water to sewerages or rivers causes harm to the public. In order to solve this problem, an apparatus according to the present invention may be better to be provided with a filtration means. As the filtration means, it is preferred to be contained activated carbon.

As one of the preferred embodiments of the present invention, a filtration means for filtering condensed water is exchangeably provided as a filter unit. As described above, poisonous gas component is dissolved or component which has a large pollution load is mixed in condensed water. Therefore, it is necessary to exchange and to allow filtering material provided in the filtration means to be durable. In this respect, the filter unit of the filtration means serves to attain this purpose. The filtering materials to be provided in the filtration means include sand, activated carbon, glass, beads, ion exchange resin, adsorption resin, phenol, formaldihyde resin, Kaynol fiber, arasido group fiber. Of the above, activated carbon is most preferably used in that it is economical and is superior for treating poisonous substance. The most favorable configuration of activated carbon is granular. The favorable particle diameter of activated carbon ranges from 0.3 mm to 15 mm, and more favorably, it ranges from 0.8 mm to 6 mm. By using activated granular carbon in the particle diameters in these ranges, the advantage of the present invention can be advantageously obtained.

The apparatus of the present invention can display its advantage when ozone is supplied in the heat exchange means and/or the filtration means or in units at the up-stream side thereof.

Poisonous and offensive odor gases generated from a waste solution or organic solvents are oxidized by ozone. Therefore, it is effective to provide ozone to units at the up-stream side of the heat exchange means.

It is very preferable to provide ozone in the filtration means for filtering condensed water. The lifetime of the filtering materials provided in the filtration means is prolonged to a great extent by providing ozone in the filtration means.

The present inventors discovered that as a result of their research, when the surface tension of a waste solution is in the range from 20 to 60 dyne/cm, a bubbling or foaming very seldom occurs in the waste solution treatment method and the apparatus therefor according to the present invention. It is more favorable that the surface tension of the waste solution is in the range from 25 to 60 dyne/cm. It is required that the surface tension of the waste solution is in this range before the evaporation means is provided with the waste solution. The followings are preferably utilized to make the surface tension of the waste solution in this range: Anti-foam agents such as organosiloxane and higher alcohols or surface active agents are added to the waste solution when or before it is heated. The above-described range of the surface tension of the waste solution can be controlled by a surface active agent which elutes from a photographic light-sensitive material.

The surface tension of the waste solution is measured by the method described in "Analysis of Active Agent and Testing Method" which was written by Mr. Fumio Kitahara, Shigeo Hayano, and Ichiro Hara in 1982 and published by Koodansha Ltd. The value of the surface tension described above is measured at 20° C. by a conventional measuring method.

In addition to the above-described discovery of the present inventors, they found that poisonous gas such as sulfur dioxide is generated in small quantity when organic acidic ferric complex salts and thiosufates are contained in a photographic waste solution at weight ratio of 0.1 to 2.5 and that when these substances are contained in the waste solution at this ratio, substance which has been condensed or dried as a result of heating is prevented from adhering to the evaporation oven or the scoop-up means to a great extent.

When the weight ratio of the organic acidic organic complex salts to thiosulfates is in the range from 0.3 to 1.6, the adherence of condensed or dried solid substance to the scoop-up means is prevented in a greater extent. The organic acidic ferric complex salts and thiosulfates will be described in preferred embodiments of the invention.

An embodiment of the invention can be preferably accomplished when an apparatus of the present invention is provided with a gas-extracting means for extracting steam vaporized by the evaporation means of the invention and exhausting steam into the heat exchange means. In the closed type-evaporation means according to the invention, the concentration of poisonous gas is highest in the evaporation portion (where waste solution is over-heated). The gas-extracting means allows the pressure present in this portion to be negative, whereby the leakage of poisonous gas from joint portions of the apparatus is prevented, and further, evaporation efficiency is increased. The method and the apparatus therefor of the present invention can be most favorably applied for treating a photographic waste solution. Above all, the advantage of the present invention can be most favorably obtained when a photographic waste solution discharged during a processing of a photographic light-sensitive material by means of an automatic developing machine, that is, the discharged waste solution is treated in the automatic developing machine or in the vicinity thereof. The automatic developing machine and a photographic waste solution will be described hereinafter.

Automatic Developing Machine

The apparatus shown by numeral 100 in FIG. 1 processes a roll-shaped photographic light-sensitive material F by guiding it in the order of a color developing solution tank CD, a bleach-fix tank BF, stabilizing treatment tank S. After it is dried D, it is wound up (though not shown, automatic developing machines include developing machines, the color developing tank CD which allows a sheet leader or a guide roller to guide a photographic light-sensitive material; a bleach tank BL; fixing tank FIX; stabilizing solution for non-water washing treatment tank Sb; and second stabilizing tank. The one shown in FIG. 1 is a representative example). Numeral 101 shows a replenishing tank. A sensor shown by numeral 102 detects the processed amount of the photographic light-sensitive material. In response to the detected information, a control unit 103 controls the amount of a replenisher to be supplied with each of the treating tanks.

The photographic processing method, the constructions of photographic treating tanks and the method of replenishing a replenisher are not limited to the one described above. For example, they can be applied to the non-water washing method disclosed in Japanese Patent Laying-Open Publication Nos. 14834/1983, 34448/1983, 132146/1982, 18631 1983, Japanese Patent Application Nos. 119840/1984, and 120658/1984.

When a replenisher is replenished with each of the photographic treating tanks, overflowed waste solution is discharged from the treating tanks, and then, collected in more than two photographic waste solution collecting tanks.

The contents of condensed or dried photographic substance contained in a waste solution can be homogeneous by treating a predetermined amount at a time. In this respect, The stock tanks 104 and 104' are useful as buffers for feeding the waste solution stored therein to the waste solution treating means.

In the automatic developing machine shown in FIG. 1, the overflowed waste solution overflowed from the upper portion of the processing solution tank caused by the replenishment of a replenisher is treated.

The overflowed waste solution can be collected by dropping it through a guide pipe, however following means may be provided, namely, the provision of a heat exchange means at positions between the stock tanks and the guide pipe, whereby thermal energy of the photographic waste solution is absorbed; means for preheating or evaporating the photographic solution before it is collected in the stock tanks 104 and 104' by utilizing the energy of the automatic developing machine or the evaporation treating means. In addition, the photographic waste solution may be transferred to the tanks 104 and 104' with a pump.

It is preferable to treat a waste solution in more than two or three groups of tanks 104 and 104' so that waste solutions may be separately treated because as described above, the components contained in tanks CD, BF, and Sb are different. It is advantageous to separate waste solution collected in the color developing tank CD from that collected in the bleach-fix tank BF and stabilizing solution for non-water washing treatment tank Sb in order to accomplish the collection of silver.

Photographic Waste Solution

The photographic waste solution to be described hereinafter is concerned with the one which is discharged from the process of processing a silver halide light-sensitive material using a photographic processing solution for a color photographic material, however, photographic solutions which can be treated according to the method and the apparatus of the invention are not limited to the use for the photographic processing solution for a color photographic material. It is to be noted that the photographic waste solutions include the one which is generated when photographic processing solutions other than this is used for processing a silver halide light-sensitive material.

A color developing solution is used when a color development processing is performed (color development processing is the process for developing a color image, that is, the process for developing a color image by a coupling reaction of an oxidant of a color developing agent and a color coupler). Therefore, it is necessary to contain a color developing agent in a color developing solution when a color development processing is carried out. The color development processing may be carried out by a color development solution which is contained in a color photographic material or an alkali solution (activated solution). In this case, a color developing agent is contained in a color photographic material. The color developing agents include the one of aromatic primary amine, aminophenol group, and p-phenylenediamine group derivative. These color developing agents can be used as salts of organic acids and inorganic acids. Following salts are preferable: Hydrochlorides, sulfates, phosphates, p-toluenesulfonates, sulfites, oxalate, benzenedisulfonates. Preferably, these compounds are contained in the amount of 0.1 g—approximately 30 g per one liter of a color developing agent. More favorably, it ranges from approximately 1 g to 15 g per one liter of the color developing agent.

The aminophenol group developers include o-aminophenol, p-aminophenol, 5-amino-2-oxy-toluene, 2-amino-3-oxy-toluene, 2-oxy-3-amino-1, 4-dimethyl-benzene. A color developing agent may contain alkali agents to be contained in a developer, e.g., sodium hydroxide, potassium hydroxide, ammonium hydroxide, sodium carbonate, potassium carbonate, sodium sulfate, sodium metaborate. Borax may be contained in the color developing agent. In addition to these compounds, following compounds may also be contained in the color developing agent: benzyl alcohol and alkali halides such as potassium bromide and potassium chloride. Following agents may be contained in the color developing agent: Development adjusting agents such as citrazinic acid and preservatives such as hydroxylamines and sulfite. In addition to the above compounds, following compounds or agents may be contained in the color developing agent: anti-foam agent; surface active agents; organic solvents such as methanol, dimethylformamide and dimethylsulfoxide. Preferably, the pH of the color developing agent is more than 7. More favorably, it is in the range from approximately 9 to 13.

The color developing agent may contain as necessary the following compounds: diethylhydroxylamine, tetronic acid, tetronimide, 2-anilineethanol, dihydroxyacetone, aromatic secondary alkohol, hydroxamic acid, pentose or hexose, pyrogallol-1,3-dimethylether. The color developing agent may contain chelating agents which act as metal ion-sealing agents. The chelating agents include aminopolycarboxylic acid such as ethylenediaminetetraacetic acid, diethylenetriaminpentaacetic acid; organic phosphonic acids such as 1-hydroxyethylidene diphosphonic acid; aminopolyphosphonic acid such as aminotori (methylenephosphonic acid) and ethylenediamintetramethylenephosphonic acid; phosphonocarboxylic acids such as 2-phosphonobutane-1,2,4tricarboxylic acid; polyphosphoric acids such as tripolyphosphoric acid and hexametaphosphoric acid; and polyhydroxy compounds.

A bleach-stabilizing solution is a processing solution to be used when a bleach-fixing is carried out (bleach-fixing process means the process whereby a metal silver generated by a development is oxidized into silver halide and a water-soluble complex is formed and non-developed portion of a coupler is color-developed). Followings are bleaching agents to be contained in a bleach-fix solution: Metal salts of organic acids are formed by replacing organic acids such as aminopolycarboxylic acid, boric acid, citric acid with metal ions of such as iron, cobalt, copper. Organic acids to be used for forming metal salts of organic acids include polycarboxylic acid and aminopolycarboxylic acid. These two carboxylic acids may be replaced with alkali metal salts, ammonium salts and water-soluble amin salts. Bleaching agents include ethylenediamintetraacetic acid, diethylenetriaminpentaacetic acid, ethylenamin-N-($\beta$-oxyethyl)-N,N,Ntriacetic acid, propylenediamintetraacetic acid, nitrilotriacetic acid, cyclohexanediaminetetraacetic acid, iminodiacetic acid, dihydroxyethylglycinecitric acid (tartaric acid), ethyletherdiamintetraacetic acid, glycoletherdiamintetraacetic, ethylendiamintetrapropionic acid, phenylenediaminetetraacetic acid, ethylenediamintetraacetate trimethylanmonium, ethylenediamintetraacetic acid tetra sodium salt, diethylenediamintriaminpentaacetic acid penta sodium salts, ethylendiamin-N-($\beta$-oxyethyl)-N,N,N-sodium trihydrochloric acid salts, propylenediamintetraacetic acid of sodium salts, sodium salts of nitrilotriacetic acid, sodium salts of cyclohexanediaminetetraacetic acid. These bleaching agents are contained in the amount of 5–150 g/l. Preferably, they are contained in the amount of 10–150 g/l. In addition to the bleaching agents described above, the bleach-fix solution may contain silver halide fixing agents and sulfites which acts as preservatives depending on necessity. In addition, following bleach-fix solutions are used: Compound consisting of complex salt whitening agent of ferrous (III) ethylenediamintetraacetic acid and small amount of halide such as ammonium bromide; compound consisting of complex salt whitening agent of ferrous (III) ethylenediamintetraacetic acid and a large amount of halide such as ammonium bromide; compound consisting of large amount of halide such as ammonium bromide and ferrous ethylenediamintetraacetic acid. The halides include, in addition to ammonium bromide, hydrogen chloride salts, hydrogen bromide salts, lithium bromide, sodium bromide, potassium bromide, sodium iodide, potassium iodide, ammonium iodide.

The silver halide fixing agents to be contained in the bleach-fix solution include compounds which form water-soluble complex salts upon reactions with silver halides which are used for fixings, for example, thiosulfates such as potassium thiosulfate, sodium thiosulfate, ammonium thiosulfate; thiocyanates such as potassium thiocyanate, sodium thiocyanate, ammonium thiocyanate; thiourea; thioether. These fixing agents are contained in the bleach-fix solution in the amount of more than 5 g/l. Normally, they are contained in the bleach-fix solution in the range from 39 g to 250 g/l.

The bleach-fix solution may contain the following pH buffer agents independently or in combination: Borax, sodium hydroxide, potassium hydroxide, sodium carbonate, potassium carbonate, sodium bicarbonate, potassium bicarbonate, acetic acid, sodium acetate, ammonium hydroxide. The bleach-fix solution may contain fluorescent bleaching agents, anti-foam agents, and surface active agents. In addition, the bleach-fix solution may contain preservatives which consist of aldehyde bisulfites; organic chelating agents such as aminopolycarboxylic acid; nitroalkohol; stabilizing agents such as nitrate; organic solvents such as methanol, dimethylsulfonamide, and dimethylsulfoxide. The bleach-stabilizing agents may contain such bleach-accelerating agents as disclosed in Japanese Patent Examined Publication Nos. 8506/1970, 556/1971, Belgium Patent No. 770,910, Japanese Patent Examined Publication Nos. 8836/1970, 9854/1978, Japanese Patent Laying-Open Publication Nos. 71634/1979, and 42349/1974.

The pH of the bleach-fix solution is normally more than 4.0, however, it is more preferable that is in the range from 5.0 to 9.5. More favorably, it ranges from 6.0 to 8.5. Most favorably, it ranges from 6.5 to 8.5.

A bleach-fix processing may be carried out by two steps, that is, a bleach processing by means of a bleaching solution whose principal component is the above-described bleaching agents; a fixing by means of a fixing solution whose principal component is the above-described fixing agents.

A stabilizing solution for non-water washing treatment functions not as a stabilizing treatment used so far, but as a treatment substituting for water washing treatment, that is, it signifies such an image stabilizing treatment as disclosed in Japanese Patent Application No. 2709/1983. By its use, water washing is unnecessary. Accordingly, it is not necessary to call a processing bath of the stabilizing solution for non-water washing treatment as a stabilizing treatment.

Using above treatment substituting for water washing treatment in combination of the apparatus according to the invention, the quantity of the waste solution may be reduced, thereby preferably reducing the load on the evaporating process.

Stabilizing agents include a solution which has a color image stabilizing function and dewatering function whereby contamination such as nonuniformity generated in water-washing is prevented; color adjusting solution for coloring a color image; antistatic solution which contains antistatic an agent. The stabilizing solutions function as a means for neutralizing, desalinating, and non-activating when a solution which contains a bleach-fix component is mixed therewith. Thus, it does not deteriorate the quality of dyes.

A component to be contained in the stabilizing solution is a chelating agent whose chelating stability constant is more than 6 (preferably more than 8). An organic carboxylic chelating agent, organic phosphoric acid chelating agent, polyhydroxy compound, and inorganic phosphoric chelating agent are known. Preferable chelating agents include ethylenediaminorhtohydroxyphenyl resin, nitrilotriacetic acid, hydroxyethylenediamintriacetic acid, diethylenetriaminpentaacetic acid, hydroxyethyliminodiacetic acid, diaminopropanoltetraacetic acid, ethylenediamintetrakismethylenesulfonic acid, nitrilotrimethylenephosphonic acid, 1-hydrocinethylidene-1, ldiphosphonic acid, 1, 1-diphosphonoethane-2-carboxylic acid, 2-phosphonobutane-1,2,4-tricarboxylic acid, 1-hydroxy-1-phosphonopropane-1,2,3-tricarboxylic acid, catechol-3,5-disulfonic acid, sodium pyrophosphate, sodium tetrapolyphosphate, and sodium hexametaphosphoric acid. Of the above compounds, diethylenetriaminpentaacetic acid, 1-hydroxyethylidene-1,1-diphosphonic acid and salts thereof are most favorable according to the present invention. These compounds are contained in a stabilizing solution in the amount of approximately 0.1-10 g per 1 liter of the stabilizing agent. Favorably, they are contained in the stabilizing agent in the amount of approximately 0.5-5 g per 1 liter of the stabilizing agent.

Compounds to be added to the stabilizing agent are ammonium compounds. The compounds are obtained from inorganic ammonium salts, e.g., ammonium hydroxide, ammonium bromide, ammonium carbonate, ammonium chloride, ammonium hypophosphite, ammonium phosphate, ammonium phosphite, ammonium fluoride, acidic ammonium fluoride, ammonium fluoroborate, ammonium arsenate, ammonium bicarbonate, ammonium bifluoride, ammonium bisulfate, ammonium sulfate, ammonium iodide, ammonium nitrate, ammonium pentaborate, ammonium acetate, ammonium adipate, laurictricarboxylic ammonium, ammonium benzoate, ammonium carbamate, ammonium citrate, ammonium diethylditio carbamate, ammonium formate, ammonium bimalate, ammonium binoxalate, potassium biphthalate, ammonium bitartrate, ammonium lactate, ammonium malate, ammonium maleate, ammonium oxalate, ammonium phthalate, ammonium picrate, ammonium pyrrolidineditio carbonate, ammonium salicylate, ammonium succinate, ammonium sulfanilate, ammonium tartrate, ammonium thioglycolate, 2, 4, 6 - trinitropheno. These ammonium compounds are added to the stabilizing agent in the amount of 0.05-100 g per one liter of the stabilizing agent. Preferably, it ranges from 0.1 to 20 g per one liter of the stabilizing agent.

Following compounds are preferably added to the stabilizing agent: pH adjusting agents such as acetic acid, sulfuric acid, hydrochloric acid, nitric acid, sufanilic acid; bezonic acid soda; hydroxybutyl benzoate; antibiotics; dehydroacetic acid, potassium sorbate; thiabendagol; ortho-phenylphenol; 5 - chloro - 2 - methyl - 4 - isothiazoline - 3 - one; 2 - octyl - 4 - isothiazoline - 3 - one; 1,2 - benzisothiazoline - 3 - one; such fungicides as disclosed in Japanese Patent Application No. 156325/1984; preservatives such as water-soluble metal salts; dispersing agents such as ethylene glycol, coal, polyvinylpyrolidone (PVP K - 15, lubiskol K - 17); hardeners such as formalin; fluorescent bleaches. Of the compounds described above, the ammonium compounds disclosed in Japanese Patent Application No. 58693/1983 adjusts the pH of an image coat to be optimal, namely, weak acidic. Acids such as sulfuric acid and hydrochloric acid are also added to the stabilizing agent. containing the fungicides are preferably used because tar is formed in slight quantity in the evaporation unit according to the present invention.

According to the invention, the preferable pH of the stabilizing ranges from 0.1 to 10. More favorably, it ranges from 2 to 9. Most favorably it ranges from 4 to 8. According to the present invention, a stabilizing treatment is carried out by means of back-flow system in which several tanks are provided and a replenisher is supplied from a tank mounted at the rear to a tank mounted at the front. This system is advantageous in that the amount of the replenisher is less than other stabilizing treatment systems. After the stabilizing treatment is made, no water-washing is necessary, however, a rinsing and surface cleaning are carried out for a short period of time by using small amount of water as necessary.

A stabilizing treatment is carried out without water-washing after a bleach-fix treatment is carried out, a silver-collecting bath, may be provided between the bleach-fix bath and the stabilizing bath so that silver may be collected for a short period. In addition, a rinsing bath consisting of water may provided. Further, dewatering bath consisting of a surface active agent may be provided. It is, preferred however, that these baths are not provided. Such treatments may be replaced with a spray method or coating.

A conditioning tank may be provided to treat a color development processing solution. It serves as a means for stopping a development, accelerating a bleaching, and preventing a developer from contaminating a bleach-fix solution. A bleach-accelerating agent and buffer agent are used as agents to be contained in the conditioner. As the bleach-accelerating agents, organic ion compounds such as mercapto compounds and thion compounds are used. Following acids such as acetic acid, citric acid, succinic acid, sulfuric acid, sodium hydroxide and alkali agents are used to adjust the conditioner to the optimum value. The preferable amount of the bleach-accelerating agent and the buffer agent to be added to the conditioner ranges from 0.001 to 100 g. In addition to the above-described additives, chelating agents may be contained in the conditioner.

When a light-sensitive material to be processed is for negatives, aldehyde derivatives are used as necessary as the stabilizing solution so that a photographic image may be preserved in a favorable condition.

Following agents are added to the negative stabilizing solution: agent for preventing generation of water-drop unevenness such as siloxane derivatives; pH adjusting agents such as boric acid, citric acid, phosphoric acid, acetic acid, sodium hydroxide, sodium acetate, potassium citrate; hardeners such as potassium alum and citric alum; organic solvents such as methanol, ethanol, dimethylsulfoxide; moisture-adjusting agents such as ethylene glycol and polyethylene glycol; and color adjusting agents for improving treatment efficiency.

The negative stabilizing solution are placed in more than two tanks so that counterflow channel may be long as in the case of the above-described stabilizing solution. The method of forming the replenisher and the amount of the replenisher to be replenished with the negative stabilizing solution are the same as those of the above-described stabilizing solution.

Stilbene group fluorescent whitening agent may be contained in a color paper color developer and stabilizing solution.

The components to be contained in waste solution of the color developer are the above-described various components and additives and the component which elute from a photographic material to be treated and accumulates in the waste solution of the color developer.

The components to be contained in the bleach-fix solution and stabilizing solution are the above-described various components and additives and the component which elutes from a photographic material and accumulaten.

The method and the apparatus according to the present invention are most favorably applied to the treatment of a photographic waste solution. Above all, they are very suitable for treating a waste solution, discharged from a photographic developer which processes a photographic light-sensitive material developed by an automatic developing machine, in the automatic developing machine or in the vicinity thereof.

In addition to the treatment of a photographic waste solution, the method and the apparatus of the present invention can be applied to the treatments of the following waste solutions: metal plating waste solution, research laboratory waste solution, photo engraving waste solution, electrification waste solution, paint waste solution, chemical industry waste solution, polishing industry waste solution, enamel waste solution, food industry waste solution, brewing industry waste solution, iron works waste solution, dyeing waste solution, printing waste solution, pipe stretch waste solution, anticorrosion waste solution, resin treatment waste solution, radiator waste solution, rubber treatment waste solution, pharmaceutical waste solution, newspaper pringint waste solution, hospital waste solution, alumite industry waste solution, food supply center waste solution, IC manufacture waste solution, carbon abrasion industry waste solution, heat treatment industry waste solution, cement industry waste solution, fluorine treatment waste solution, ink manufacture waste solution, print-circuit board manufacture waste solution, automatic frilling machine waste solution, PS plate automatic developing machine waste solution, water washing eliminating machine waste solution, name plate manufacture waste solution, electrodeposition painting waste solution, phosphoric acid coating waste solution, semiconductor manufacture industry waste solution, battery manufacture waste solution, cosmetic industry waste solution, restaurant waste solution, FRP aci-resistant work waste solution.

PREFERRED EMBODIMENTS OF THE INVENTION

Figure 2:
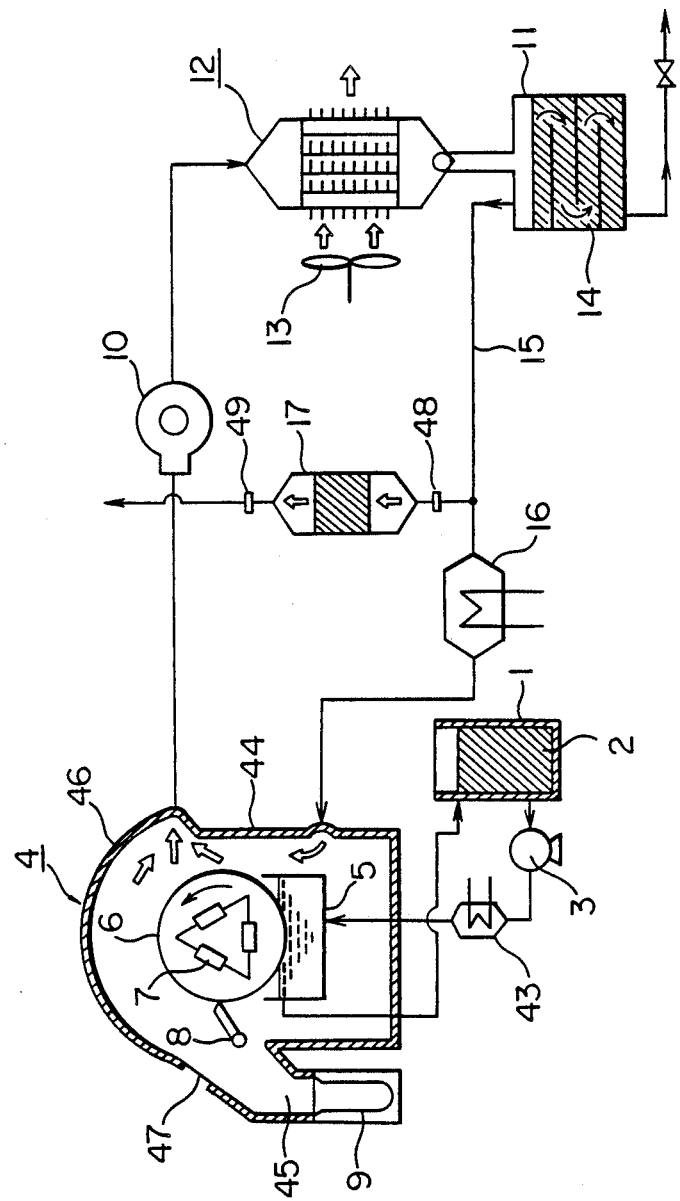
FIG. 2 is a schematic diagram showing a first embodiment of the present invention.

Referring to the embodiments of the present invention according to the drawings; FIG. 2 shows the schematic drawing of the first embodiment, wherein 1 represents a waste-solution tank containing waste solution 2. The waste-solution tank 1 is a container covered with heat insulator and has air-tightness to prevent odor and heat from diffusing. The waste solution 2 in the waste-solution tank 1 is fed to waste-solution reservoir 5 by feed pump 3; furthermore, the waste solution in waste-solution reservoir 5 is fed back to waste-solution tank 1; thus, the waste solution is circulating. The waste solution 2, however, does not have to be necessarily circulated. Moreover, the liquid level in waste-solution reservoir 5 is always adjusted to the constant level by the liquid-level-detection sensor, which is not shown in the drawing. Electric heater 43 may be installed on the path leading to waste-solution tank 1 or waste-solution reservoir 5 in order to preheat waste solution 2. When disposing the photograph-processing waste solution, which is the most preferable application of the present invention, the waste solution discharged from the automatic developing machine may be, for example, directly carried over to the waste-solution tank 1 by the operator, or the waste solution may be automatically discharged to the waste-solution tank 1 from the automatic developing machine, or the waste solution may be directly discharged to waste-solution reservoir 5 from the automatic developing machine. When the waste solution is automatically discharged to waste-solution tank 1, a liquid-level-detecting sensor should be preferably installed in waste-solution tank 1.

Thus, waste solution 2 fed into waste-solution reservoir 5 is then heated and evaporated by heat-evaporation unit 4. Waste solution 2 is carried upward along the circumferential surface of rotating rotation drum 6 as one example of a scoop-up means which is rotatively installed in drum hood cover 44; waste solution 2 is, then, heated by electrical heater 7 installed in the rotation drum 6. Rotation drum 6 is formed by materials such as metal, ceramic, glass, and synthetic resin which are surface-treated for corrosion prevention; including materials whose surfaces are coated with members such as cloth, synthetic resin, and foam which can absorb waste solution, and materials whose surfaces are formed convex or concave. Particularly, materials made of titanium or stainless steel are preferably employed.

The heating method for this embodiment employs electric heater 7; however, the method is not limited to this one, for example, other heating method such as the oil bath or moist-heat system can be also employed.

The residual solid component on the rotation drum 6 surface generated by the heat treatment is removed by scraper 8, and is then collected through chute 45 as a guide member into the container 9. Since the residual solid component is in a powdery state and is easy to be scattered around, it is recommended that, for example, container 9 should employ nylon bag which can be sealed by the heat-sealing device. By doing so, the residual solid component is not scattered around, and the operator's hands are free from being contaminated throughout the disposal operation. As shown in FIG. 1, evaporation unit 4 includes a drum hood cover 44 covered with heat insulator 46, having glass window 47, through which the operation of scraper 8 can be observed. The drum hood cover 44 and heat insulator 46 form an enclosure means 46'. The enclosure means is continuous such that its interior is self-contained. As a result, the enclosure means prevents air from contacting the apparatus located therein such as the waste-solution reservoir 5.

The steam generated by the above-mentioned heat treatment is extracted and fed to condenser unit 12 by circulation fan 10. In the conventional system, offensive odor or toxic gas leaks into the generated steam, because the pressure in heat-evaporation unit 4 becomes very high. As shown in this embodiment, however, the generated steam is absorbed and fed into condenser unit 12, thus eliminating the conventional disadvantages.

The steam fed into condenser unit 12 is cooled (heat exchange effect) and condensed by rapid-cooling fan 13, then the condensed water drops into drain tank 11. The condensed water collected in drain tank 11 is filtered by filter unit 14 before being discharged outside the system. Filter unit 14 filters components of the condensed water with high potentiality of environmental pollution. Generally, the activated charcoals should be preferably used for filtering means; in this embodiment, filter unit 14 comprises severally divided activated-charcoal chambers. In this way, the steam generated by the above-mentioned heat-evaporation process is condensed; and the condensed water is, then, filtered before being discharged. The non-condensation components, which are not condensed even after passing through condenser unit 12, pass through path 15, then are fed again into heat-evaporation unit 4 after being heated by air heater 16. When, for example, disposing photograph-processing waste solution, offensive odor or toxic component are contained in the non-condensation steam component; as shown in this embodiment, the odor or toxic component is retained inside the unit if the non-condensation component is fed into heat evaporation unit 4. The suction means may be installed in the path which feeds non-condensation component into heat-evaporation unit 4. The heating process conducted by air heater 16 is not necessarily required, but preferable in order to keep the heat efficiency of heat-evaporation unit 4. Numeral 17 represents an absorption tower containing activated charcoal, which adjusts internal and external pressures. Numeral 48 and 49 represent damper and exhaust fan, respectively.

In this embodiment, the steam generated in heat-evaporation unit 4 is fed downward into condenser unit 12; however, the steam may be fed upward into condenser unit 12.

Also in this embodiment, filter unit 14 employs activated charcoal as filter medium. The filter medium should be periodically replaced or checked, because the filter medium absorbs components which have high risks for environmental pollution. The filter medium, however, can be reactivated by being supplied with ozone. In this embodiment, the life time of the filter medium can be significantly lengthened by supplying ozone to, for example, drain tank 11, allowing lesser replacement and check frequency of the filter medium.

Figure 3:
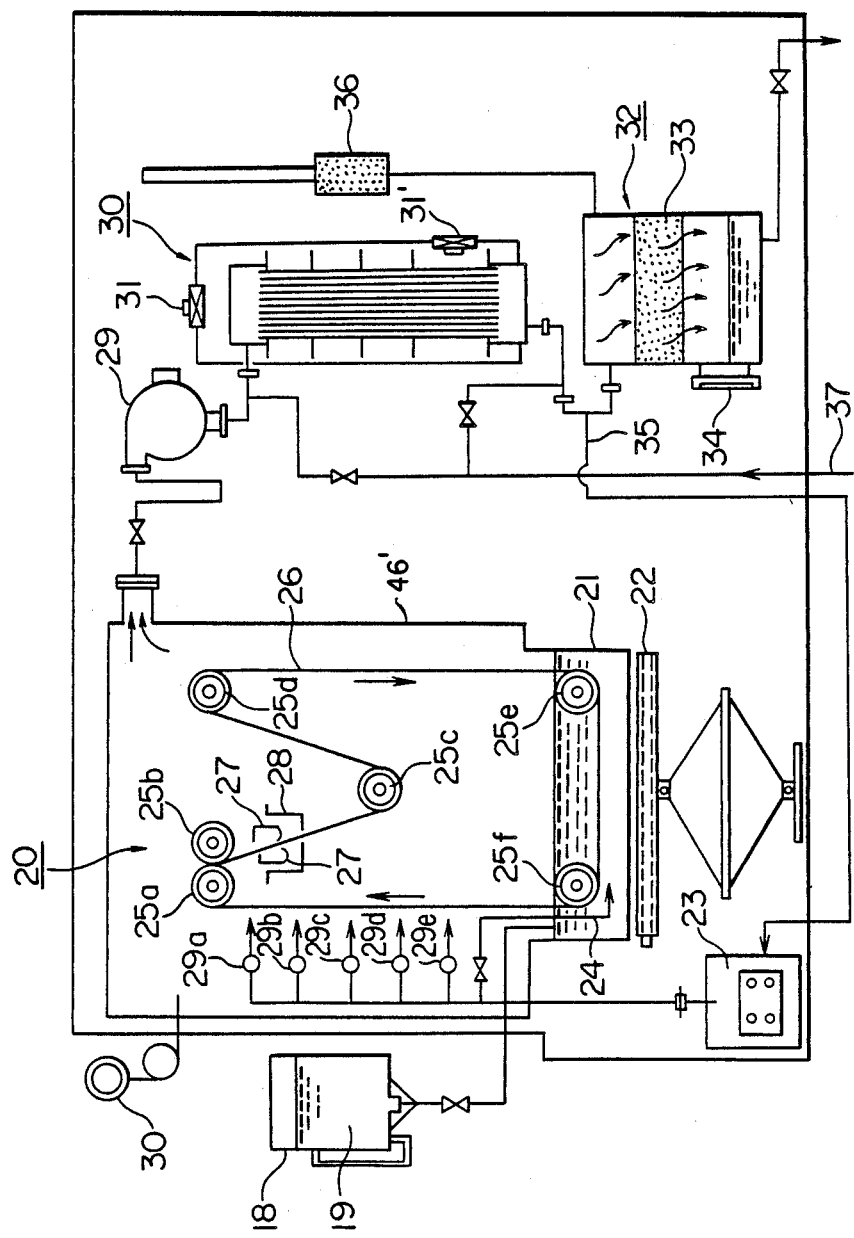
FIG. 3 is a schematic diagram showing a second embodiment of the present invention.

FIG. 3 shows the schematic drawing of the second embodiment of the present invention. Numeral 18 represents waste-solution tank accommodating waste solution 19, which is fed from waste-solution tank 18 to waste-solution reservoir 21 mounted below heat-evaporation unit 20 with the flow rate controlled. Waste solution 19 fed into waste-solution reservoir 21 is preheated by heater 22 in order to enhance the efficiency of the heat-evaporation processing; furthermore, the heated air generated in heated-air generator 23 is injected 24 (i.e., air bubble) in waste-solution reservoir 21.

The heat-evaporation processing of waste solution 19 is performed in the following manner: Waste solution 19 is carried upward by endless belt 26 which is mounted on rotation rollers 25a–25f and moves in the direction shown by the arrow. At this time, waste solution 19 carried upward is heated by the heated air blowing from air outlets 29a–29e. Heat-evaporation unit 20 is an airtight container or enclosure means 46' covered with heat insulator to prevent heat dissipation, and the inner temperature is detected by thermometer.

The residual solid component on endless belt 26 generated by the heat-evaporation processing is removed by scraper 27, and is collected in hopper 28.

On the other hand, the steam generated by the heat-evaporation processing is absorbed from the air exit located at the upper portion of heat-evaporation unit 20 by means of circulation fan 29, and then is fed to condenser unit 30. In condenser unit 30, air-cooling fans 31 and 31' are working, and the steam fed from the heat-evaporation unit 20 is condensed to become condensed water by the heat-exchange effect. The condensed water containing offensive odor or toxic components is then filtered by filter unit 32. In this embodiment, filter unit 32 is filled with filter medium such as activated charcoal, and the condensed water passes through the filter medium 33 from the upper portion to the lower portion. The filtered condensed water is collected in the lower portion of filter unit 32; the liquid-level indicator 34 shows the level of the water collected, and when reaching the specified level, the water is discharged outside. The non-condensation components which are not coagulated even after passing through condenser unit 30 are fed again into heated-air generator 23 through the path shown by numeral 35; thus, circulation is performed. The non-condensation components may be fed into heat-evaporation unit 20. Not shown in the drawing, however, the absorption means for making the circulation smoothly and the heating means for keeping the heat efficiency of heat evaporation unit 20 may be installed in the path indicated by numeral 35.

Numeral 36 represents an exhaust pipe filled with activated charcoal, which adjusts the pressure in the system.

As described previously, ozone has the effect of reactivating the filter medium. Also in this embodiment, the life time of the filter medium can be lengthened by supplying ozone into the system from the intake shown by numeral 37.

Figure 4:
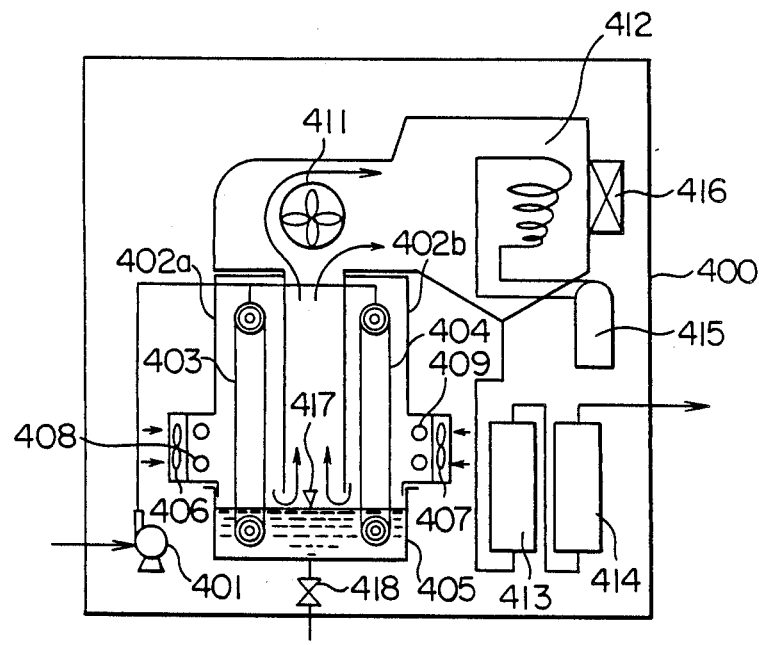
FIG. 4 is a schematic diagram showing a third embodiment of the present invention.

FIG. 4 is a schematic drawing of the third embodiment of the present invention. The metering pump 401 feeds the waste solution of the waste-solution tank 201, which is not shown in the drawing, but actually is installed outside the waste-solution-treatment system 400, downward from pair of endless belts 403 and 404, which are installed in heat-evaporation units 402a and 402b, onto the endless belt 403 and 404; thus, the waste solution is collected in waste-solution reservoir 405. The waste solution is carried upward by endless belts 403 and 404, and is fed to fans 406 and 407 mounted on both sides of waste solution reservoir 405; furthermore, the waste solution is heated by the heated air generated by being heated by heaters 408 and 409. The steam generated by this heat-evaporation processing passes through exhaust port 410 mounted between heat evaporation units 402a and 402b; and then, is drawn into circulation fan 411. The steam is condensed by condenser unit 412 to become condensed water, which passes through two columns 413 and 414, and then is discharged out of waste-solution-treatment system 400. Numeral 415 represents a refrigerator. On the other hand, non-condensation components which are not condensed even after passing condensation unit 412, are discharged through gas-processing column 416 filled with activated charcoal into the system. When liquid-level indicator 417 installed in waste-solution tank 201 detects that there is no waste solution in the waste-solution tank, an alarm buzzer, not shown in the drawing, sounds; then, the condensed waste solution is discharged by means of opening drain cock 418.

Figure 5:
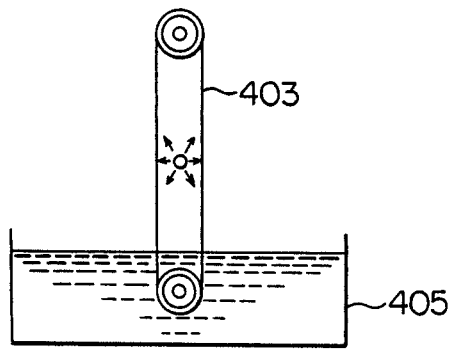
FIGS. 5 and 6 are schematic diagrams of another embodiment in which heated air is fed.
Figure 6:
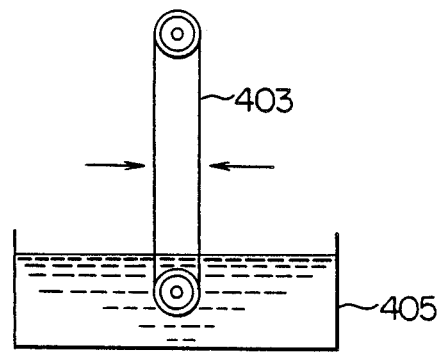

FIGS. 5 and 6 show other embodiments for feeding heated air to endless belt 403. In FIG. 5, the heated air is fed from the center of spanned endless belt 403; in FIG. 6, the heated air is fed from both sides of spanned endless belt 403, thus heating the waste solution.

Figure 7:
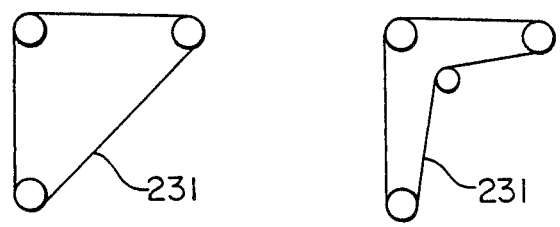
FIG. 7 is a schematic diagram showing another embodiment of an endless belt.
Figure 7:
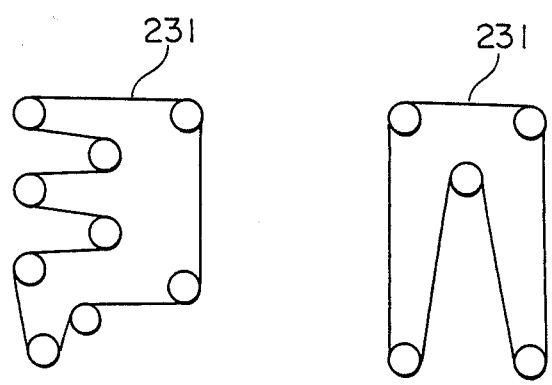
Figure 7:
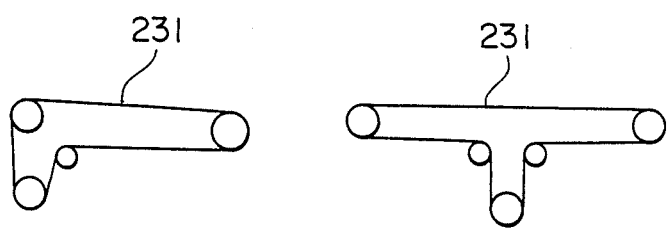
Figure 8:
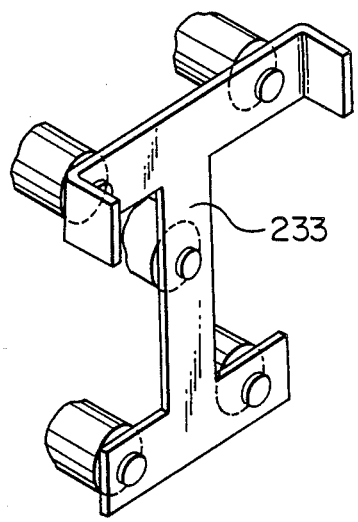
FIGS. 8 and 9 are perspective illustrations showing a belt driving means.
Figure 9:
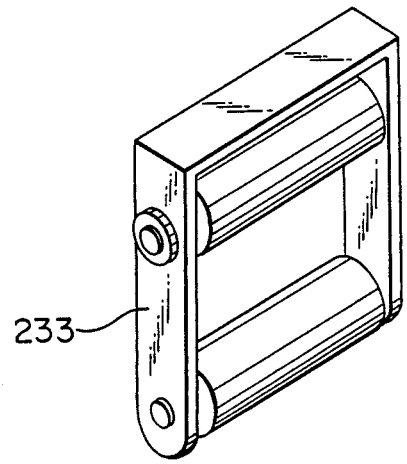

FIG. 7 through FIG. 9 show the embodiments of the endless belt and the driving means.

The material for belt 231 should be preferably the inorganic fiber such as nonflammable carbon and glass fiber, or aramid fiber. The belt may be made of woven textile or the woven textile on which above-mentioned fibers are planted. Instead of belt 231, a chain or belt combined with plate or rod made of metal, ceramic, or synthetic resin whose surface is formed to have a number of holes, grooves, or flutes, may be used. Moreover, convex or concave figure may be formed on the surface of belt 231, and also the convex or concave figure may be formed with the different material from the material of belt 231 such as metal. The surface color of belt 231 should be preferably black in order to gain a better heat-absorption rate.

As shown in FIG. 7, belt 231 may have various configuration other than a loop. In order to mount belt 231, for example, as shown in FIG. 8 and FIG. 9, supporting frame 233 to be fixed to the side wall or ceiling (including the cover) of the processing chamber should be prepared first, and one or both ends of the shaft to which belt 231 is mounted should be fixed. The fixation method of supporting frame 233 includes, other than fixing with machine screws on the side wall of the processing chamber, for example, the following method, wherein a guide rail is arranged along the side wall of the processing chamber so that supporting frame 233 can move horizontally, vertically and diagonally along the guide rail.

Using the guide rail, the scoop-up, or carrying means is moved vertically to link with the gear drive system, and the lower end of belt 231 can be immersed in the waste solution of the container; moreover, the container can be removed horizontally by moving the scoop-up, or carrying means vertically. To obtain the above mentioned motion, notches may be formed on supporting frame 233 to engage with the end portion of the belt so that each shaft may be removed individually.

Figure 10:
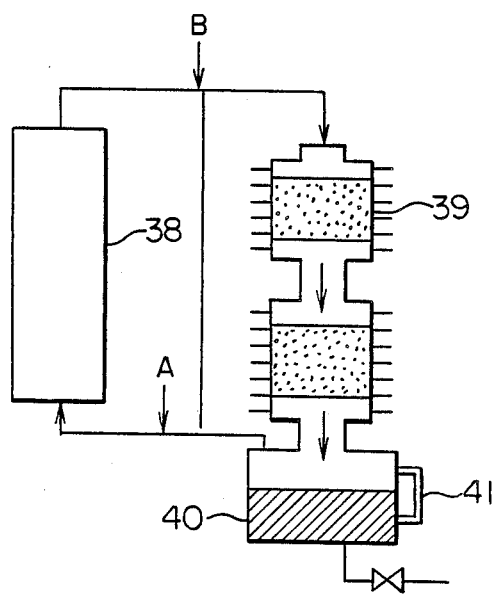
FIGS. 10 and 11 are schematic diagrams showing other embodiments of condenser portions.
Figure 11:
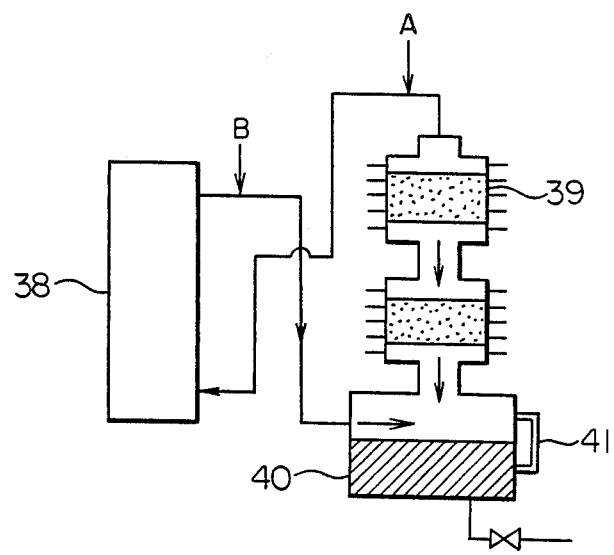

FIG. 10 and FIG. 11 show other embodiments of condenser unit 12 and 30 described in FIG. 2 and FIG. 3. In FIG. 10 and FIG. 11, numeral 38 corresponds to numeral 20 shown in heat-evaporation unit 20; numeral 39 represents the condenser unit filled with filter medium such as activated charcoal. In FIG. 10, the steam generated in heat-evaporation unit 38 is fed downward from condenser unit 39; while in FIG. 11, the steam is fed upward from condenser unit 39.

In both cases, heat exchange and condensed water filtration are carried out at the same time, i.e., the filtered condensed water is discharged from under the condenser unit 39; thus, the above-described filtration means is also used as heat exchange means. The filtered condensed water is stored in tank 40, and whenever liquid-level indicator 41 detects the specified level, the specified amount of the condensed water is discharged.

In FIG. 10 and FIG. 11, a gas-adsorption column communicating the outside air and air-intake means should be preferably installed in the position A and B, respectively.

Figure 12:
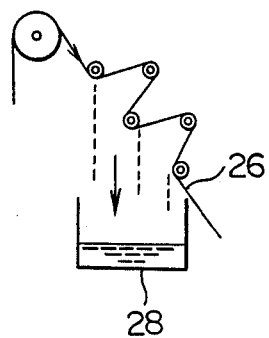
FIG. 12 (a), (b), and (c) are schematic diagrams showing another embodiment of the scraping portion.
Figure 12:
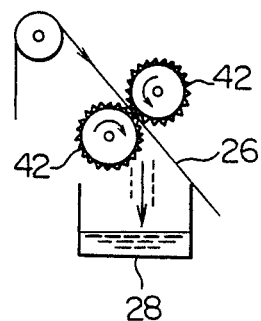
Figure 12:
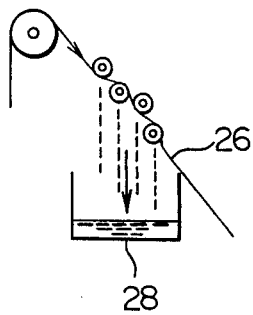
Figure 13:
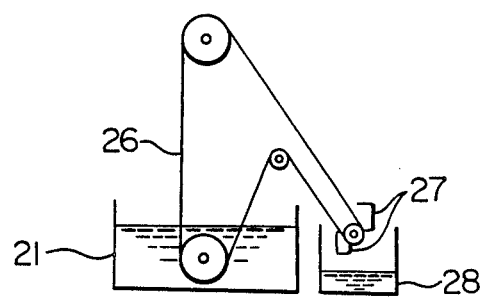
FIG. 13 is a schematic diagram showing another embodiment of the vicinity of the scraping portion.

FIG. 12 shows other embodiments of the scraper portion of FIG. 3. In the embodiment shown in FIG. 3, the residual solid component on endless belt 26 is removed by means of scraper 27; while, as shown in FIG. 12 (a) and (b), the solid component may be removed by forcibly meandering endless belt 26, or as shown in FIG. 12 (c), by means of gear 42. To prevent the removed solid component from falling into waste-solution reservoir 21, as shown in FIG. 13, hopper 28 may be moved downward.

EXPERIMENTS

The experiments according to the present invention will be described hereinafter, however, many modifications are possible.

After a color photography paper available on the market was imagewise-exposed, consecutive treatment was carried out using treating solutions according to the following treatment procedure. Standard Treatment Process

| (1) Color development | 38° C. | 3 minutes |
|---|---|---|
| (2) Bleach-fix | 38° C. | 90 seconds |
| (3) Stabilizing treatment | 25° C.–35° C. | 3 minutes |
| (4) Dry | 75° C.–100° C. | approx. 2 minutes |
| Compositions of Treating Solutions color development tank solution | | |
| Benzyl alcohol | | 15 ml |
| Ethylene glycol | | 15 ml |
| Potassium sulfite | | 2.0 g |
| Potassium bromide | | 1.3 g |
| Sodium chloride | | 0.2 g |
| potassium carbonate | | 24.0 g |

-continued

| | |
|---|---|
| 3-methyl-4-amino-N-ethyl-N-(β-methanesulfonamidoethyl aniline sulfate | 4.5 g |
| Fluorescent whitening agent (4, 4'-diaminostilbenedisulfonic acid derivative) | 1.0 g |
| hydroxylamine sulfate | 3.0 g |
| 1-hydroxyethylidene-1, 1'-diphosphonic acid | 0.4 g |
| Hydroxyethyliminodiacetic acid | 5.0 g |
| Magnesium chloride.hexahydrate | 0.7 g |
| 1, 2-dihydroxybenzene 3, 5-disulfonic acid, disodium salt | 0.2 g |

Water was added to one liter solution and potassium hydroxide and sulfuric acid were added to the solution to adjust the solution to pH 10.20.

| Color Development Replenisher | |
|---|---|
| Benzyl alcohol | 20 ml |
| Ethylene glycol | 20 ml |
| Potassium sulfite | 3.0 g |
| Potassium carbonate | 24.0 g |
| Hydroxyalmin sulfate | 4.0 g |
| 3-methyl-4-amino-N-ethyl-N-(β-methanesulfonamidoethyl) aniline sulfate | 6.0 g |
| Fluorescent whitening agent (4, 4'-diaminostilbenedisulfonic acid derivative | 2.5 g |
| 1-hydroxyethylidene-1, 1'-diphosphonic acid | 0.5 g |
| Hydroxyethyliminodiacetic acid | 5.0 g |
| Magnesium chloride.hexahydrate | 0.8 g |
| 1, 2-dihydroxybenzene 3, 5-disulfonic acid - disodium salt | 0.3 g |

Water was added to one liter solution and potassium hydroxide and sulfuric acid were added to the solution to adjust the solution to pH 10.70.

| Bleach-fix Tank Solution | |
|---|---|
| Ferrous ethylenediamintetraacetic acid Ammonium dihydroxide | 60 g |
| Ethylenediamintetraacetic acid | 3.0 g |
| Ammonium thiosulfate (70% solution) | 100.0 ml |
| Ammonium sulfite (40% solution) | 27.5 ml |

Water was added to prepare one liter solutions. Potassium carbonate or glacial acetic acid was added to the solution to adjust pH to 7.1. Bleach-fix Replenisher A

| | |
|---|---|
| Ethylenediaminetetraacetic acid ferric ammonium dihydrate | 260.0 g |
| Potassium carbonate | 42.0 g |

Water was added to prepare one liter solution. Acetic acid or ammonia water was added to adjust the solution to pH 6.7±0.1 Bleach-fix Replenisher B

| | |
|---|---|
| Ammonium thiosulfate (70% solution) | 500.0 ml |
| Ammonium sulfite (40% solution) | 250.0 ml |
| Ethylenediaminetetraacetic acid | 17.0 g |
| Glacial acetic acid | 85.0 ml |

Water was added to prepare one liter solution. Acetic acid or ammonia water was added to adjust the solution to adjust to pH 5.3±0.1.

| | |
|---|---|
| Ethylene glycol | 1.0 g |
| 2-methyl-4-isothiazoline-3-one | 0.2 g |
| 1-hydroxyethylidene-1, 1-diphosphonic acid (60% solution) | 1.0 g |
| Ammonia water (ammonium hydroxide 25% water solution) | 2.0 g |

Water was added to prepare one liter solutions. A solution containing 50 % sulfuric acid was added to adjust the solution to pH 7.0.

An automatic developing machine was provided with the color developing tank solution, bleach-fix tank solution, and stabilizing tank solution. Running test was conducted by the following method: While the color photographic paper was being processed, the color development replenisher, the bleach-fix replenishers A and B, and the stabilizing replenisher were supplied with the developing machine with a bellows pump every three minutes. The amount replenished with the color development tank was 190 ml (this amount is per 1 $m^2$ of the color paper). The same applies correspondingly to the following. The bleach-fix replenishers A and B were supplied with the bleach-fix tank in the amount of 50 ml, respectively. The stabilizing solution for non-water washing treatment was supplied with the stabilizing tank in the amount of 250 ml.

A consecutive processing was carried out until the stabilizing solution for non-water washing treatment was supplied three times as great as the capacity of the stabilizing tank.

The experiments using the overflowed solution carried out according to the above-described treatment will be described hereinafter. In the description made below, the color development solution which overflowed from the color development tank is referred to as CD waste solution. The bleach-fix solution which overflowed from the bleach-fix tank is referred to as BF waste solution. The stabilizing treatment solution which overflowed from the stabilizing tank is referred to as Sb waste solution.

Experiment 1

The chemical compositions of each of the waste solutions were analized. The following components were detected. CD waste solution:
a. Benzyl alcohol
b. Potassium carbonate
c. Sulfites (sodium salts or potassium salts)
d. Color developing agent
e. Hydroxylamine
f. Fluorescent whitening agent
g. ethylene glycol
BF waste solution
a. EDTA ferric complex salts
b. Thiosulfates (ammonium salts or potassium salts)
c. Silver complex salts
d. Sulfites
e. Ammonium bromide salts (Note: Since a bleaching and fixing were carried out in separate tanks, components detected in the waste solution discharged from bleach-fix solution were different from that discharged from the fixing solution, that is, the components detected in the former were EDTA ferric complex salts and ammonium bromide salts and the components thiosulfates and sulfites such as ammonium salts and sodium salts). Sb waste solution: Ammonium compounds and component of the bleach-fix solution The above photographic waste solutions were mixed and evaporated with a drop type-waste treatment apparatus as shown in FIG. 2. The wattage of an electric heater 7 used was 3.6 KW. The wattage of the air heater 16 used was 1 KW. The drum hood cover 44 consisting of glass wool heat insulator was 20 mm. The rotating drum 6 consisted of titanium. The other members consisted of stainless SUS316. Granular activated carbon FILTRASORB300 manufactured by Toyo Karugon Vo., Ltd. was placed in drain tank 11. The wattage of the electric heater 43 used was 0.5 KW. The solution supplying pump 3 was being operated during the experiment so that waste solution whose temperature was 60° C.–90° C. could circulate through waste solution tank 5 and solutions which overflowed the tanks could return to waste solution tank 1.

Condenser portion 12 consisted of stainless steel SUS316L in which a heat exchange means consisting of a plurality of pipes whose length was 0.5 m and whose diameter was 20 mm. A heat release fin was provided in the periphery of the pipes.

The waste solution treating apparatus was operated for 10 hours consecutively. As a result, the number of photographic waste solutions collected was 18 liters. The number of discharged solutions which passed filtration portion was 17 liters.

The BOD values of these discharged solutions were 80 ppm and colorless and odorless. No odor was felt in the periphery of the treatment apparatus. There occurred no bumpings.

COMPARISON EXPERIMENTS

Similar experiments were conducted by removing the means for feeding non-condensed component to heat-evaporation portion 4, with the result that the number of photographic waste solutions treated during 10 hours was only 13 liters. The odors of ammonia and sulfur dioxide were felt 10 hours thereafter. Bumping in small degree occurred during developments 10 hours later and waste solutions dispersed.

Similar experiments were conducted by removing the activated carbon placed in filtration portion 14, with the result that the BOD value of discharged solution was 960 ppm, that the color thereof was cloudy, and that the discharged solution was redolent of ammonia and sulfur dioxide.

Similar experiments were conducted by removing the activated carbon placed in gas treatment column 17, with the result that ill-smelling was redolent in the periphery of the treating apparatus. When gas treating column 17 was removed from the treating apparatus so that no gases communicate from and to the apparatus, ill-smelling was redolent as well in the periphery of the apparatus.

An experiment similar to experiment 1 was conducted by removing condenser portion 12, with the result that evaporation condensed on the granular activated carbon in gas treating column 17, that is, the carbon did not serve as a means of absorbing gas and ill-smelling was redolent in the periphery of the apparatus.

An experiment similar to the manner conducted in experiment 1 was conducted by removing circulation fan 10 for suctioning gas, with the result that the number of discharged solutions was only 12 liters during 10 hours, that the inner wall of the apparatus got completely wet, that dried substance of a waste solution scraped with scraper 8 adhered to chute portion 45, and that the dried substance was not collected in dried substance-collecting container 9.

Experiment 2

An ozone generator (OZGU - 75 manufactured by Esutekku Co., Ltd.) was mounted on the waste solution treating apparatus used in experiment example 1. Generated ozone was introduced into the start portion of capacitor portion 12 with a miniature pump.

The BOD value of discharged solution which passed filtration portion 14 was 60 ppm.

A similar experiment was conducted by introducing ozone into filtration portion 14, with the result that the BOD value of a discharged solution was 55 ppm. A waste solution was treated for 20 days 10 hours per day in the same manner as experiment 1, with the result that the BOD value of a discharged solution was 120 ppm and that the BOD value of a discharged solution was as small as 90 ppm when ozone was introduced into filtration portion 14.

Experiment 3

A waste solution was prepared by mixing solutions CD, BF, and Sb used in experiment example 1 at the rate of 1 : 1 : 1 using the treating apparatus used in experiment example 1. An experiment similar to the manner used in experiment example 1 was conducted using Oranosiloxane manufactured by Dow Corning Co., Ltd. (FS Antifoam 025). The surface tension of prepared waste solution was in the range from 20 to 70 dyne/cm. It was detected that a bumping occurred in a small extent while the solution was being evaporated in order to condense it in the condition the surface tension of the solution was in the range from 20 to 65 dyne/cm, however, bumpings occurred in the range other than 20 to 65 dyne/cm and that the waste solution which has condensed on the inner wall of the evaporation oven dispersed. When the surface tension of the waste solution was in the range from 25 to 60 dyne/cm, no bumpings occurred, so that the solution was treated by way of evaporation.

Experiment 4

Using the model photographic waste solution used in experiment 1, an experiment similar to the manner used in experiment example 1 was conducted by varying the weight ratio of the amount of ammonium ethylenediaminetetra acetate ferric salt to that of ammonium thiosulfate contained in a solution varied in the range from 0 to 5.

As a result, it was detected that when the weight ratio of the amount of the organic ferric acid complex salt to the amount of thiosulfate was in the range from 0.1 to 2.5, the amount of component, which condensed or dried from the waste solution, adhered to the rotating drum in a small degree and that sulfur dioxide was generated in a small degree. When the above-described mixture ratio of the two compounds was in the range from 0.1 to 1.6, a very favorable result was obtained.

Experiment 5

An experiment was conducted in the manner of experiment example 1 except that the rotating drum was replaced with an endless belt as shown in FIG. 3.

The result obtained in the above experiment was very similar to that obtained in experiment example 1, however, the apparatus was approximately 1.5 as big as that used in experiment example 1.

A nylon bag for use in radar range was placed inside waste solution tank 21.

Experiment 6

An experiment was conducted in the manner similar to experiment 5 except that scraping means 27 (stainless knife) was removed from the apparatus in which the endless belt was used, with the result that substance was concentrated in waste solution tank 21. It was necessary to replace nylon bags every 10 hours. When scraping means 27 was provided in the apparatus, it was unnecessary to replace nylon bags even though the waste solution was treated as long as 100 hours.

Experiment 7

An experiment was conducted in the manner similar to that of experiment 1 except that fluorine resin was applied to the surface of the rotating drum used in Experiment 1, with the result that dried substance in a waste solution was easily scraped, that is, the lifetime of the scraper was approximately three times as long.

Experiment 8

A similar experiment was conducted to examine a pulp waste solution (BOD, 2800 ppm) and dye waste solution (BOD, 890 ppm) by using the waste solution treatment apparatus used in experiments 1 and 5, with the result that no offensive odor was redolent in the periphery of the apparatus. The BOD value of discharged waste solution was measured, with the result that BOD values were 45 ppm (pulp waste solution) and 20 ppm (dye waste solution) and that they were colorless and odorless.

Experiment 9

An experiment was conducted in the manner similar to the above except that the condenser portion using a rotating drum was replaced with the apparatuses as shown in FIGS. 10 and 11. The result obtained in this experiment was similar to that obtained in experiment 1.

Granular activated carbon FILTRASORB300 and IVP manufactured by Toyo Carugon Co., Ltd. were contained in condenser portion at the ratio of 1 : 1.

Experiment 10

An experiment was conducted in the similar manner by removing the filtration means (activated carbon 14 and 33), with the result that the BOD values were 50 ppm (pulp waste solution) and 29 ppm (dye waste solution.)

As apparent from the foregoing description, according to the waste solution treatment method, poisonous or ill-smelling component generated as a result of evaporation treatment of a waste solution can be treated without allowing it to leak to the exterior of an apparatus, whereby pollution prevention can be performed and operators can work in a favorable atmosphere.

In addition, the waste solution treatment method of the present invention is superior in thermal and evaporation efficiencies and operated without using much energy. Further, when a waste solution is being treated by means of evaporation, bumpings occur in a light degree.

Furthermore, the waste solution treatment method of the present invention can be performed with an apparatus having a simple construction. Accordingly, a waste solution, generated when a photographic light-sensitive material is developed by an automatic developing machine, can be treated within the automatic developing machine or in the vicinity thereof.

What is claimed is:

1. A waste liquid treatment apparatus for treating waste solutions resulting from photographic processing comprising:
   evaporation means including a continuous enclosure means having an interior portion sealed by said enclosure means from communication with the ambient, and heating means for heating the waste solution to its evaporation point to form waste vapor;
   a waste solution reservoir disposed in said interior portion of said enclosure means, for containing waste solution;
   means for maintaining the waste solution in the reservoir at a constant level;
   means for supplying said waste solution reservoir with waste solution;
   the waste solution reservoir being located in said interior and sealed from the ambient to contain any offensive odors and toxic gases generated thereby;
   condenser means for condensing the waste vapor to form waste condensate, said condenser means including a drain tank for collecting waste condensate, said drain tank having an interior portion, vent means in communication with said drain tank for exhausting a non-condensable gas component of said waste vapor from the interior portion of said drain tank, said vent means including gas treatment means for treating the non-condensable gas component, the gas treatment means including means for regulating the pressure of the interior portion of the enclosure means to establish a pressure differential between the pressure of the interior portion of the enclosure means and ambient pressure;
   communication means for placing said condenser means in communication with said interior portion of said enclosure means; and
   an air vent line for placing said vent means in communication with said gas treatment means, said air vent line having a branch line extending from a branch point between said drain tank and said gas treatment means, said branch line being connected to said enclosure means to place said drain tank in communication with said enclosure means.

2. The waste liquid treatment apparatus as claimed in claim 1, further including:
   a drum, partially immersed in said waste solution reservoir and having an external surface, said external surface rotating through waste solution contained in said waste solution reservoir to coat said external surface with waste solution; and
   solid removing means, disposed in the interior portion of said enclosure means, to remove said waste solids from said external surface of said drum after the waste vapor has evaporated.

3. The waste treatment liquid apparatus as claimed in claim 1, further including:
   an endless belt traversing a path defined by a plurality of rollers, one of said rollers being partially immersed in said waste solution reservoir, said endless belt being coated with waste solution upon passing through said waste solution; and
   solid removing means, disposed in the interior portion of said enclosure means, to remove waste solids from said endless belt after the waste vapor has evaporated.

* * * * *